Feb. 12, 1952 A. T. SINKS ET AL 2,585,693
GYROSCOPIC DIRECTION INDICATOR
Filed Aug. 2, 1945 4 Sheets-Sheet 1

Inventors:
Allen T. Sinks, Deceased.
Anna C. Sinks, Administratrix.
Richard A. Pfuntner,
Samuel Gabrielson,
by Harry E. Dunham
Their Attorney.

Feb. 12, 1952 A. T. SINKS ET AL 2,585,693
GYROSCOPIC DIRECTION INDICATOR
Filed Aug. 2, 1945 4 Sheets-Sheet 2

Fig. 2.

Inventors:
Allen T. Sinks, Deceased.
Anna C. Sinks, Administratrix.
Richard A. Pfuntner,
Samuel Gabrielson,
by Harry E. Dunham
Their Attorney Feb. 12, 1952 A. T. SINKS ET AL 2,585,693
GYROSCOPIC DIRECTION INDICATOR Filed Aug. 2, 1945 4 Sheets-Sheet 3

Inventors:
Allen T. Sinks, Deceased.
Anna C. Sinks, Administratrix.
Richard A. Pfuntner,
Samuel Gabrielson,
by Harry E. Dunham
Their Attorney.

Patented Feb. 12, 1952

2,585,693

UNITED STATES PATENT OFFICE 2,585,693

GYROSCOPIC DIRECTION INDICATOR

Allen T. Sinks, deceased, late of Beach Bluff, Mass., by Anna C. Sinks, administratrix, Beach Bluff, Mass., and Richard A. Pfuntner, Saugus, and Samuel Gabrielson, Lynnfield, Mass., assignors to General Electric Company, a corporation of New York Application August 2, 1945, Serial No. 608,506

12 Claims. (Cl. 74—5.46)

1

The present invention relates to gyroscopic direction indicators for aircraft of the type in which the rotatable compass dial is actuated primarily by means of a directional gyro, and secondarily by means of a magnetic compass which acts slowly to correct the gyro upon a departure of the spin axis thereof from a predetermined relationship with the magnetic meridian as measured by the compass, and a general object of the present invention is to provide a new and improved device of this character.

A magnetic compass when used as a direction indicator on aircraft is subject to the disadvantage that it is thrown off by accelerations, making reading difficult in rough air and practically impossible during turns. A directional gyro type of indicator has the advantage that it is not affected by acceleration but is subject to slow wander or drift due to rotation of the earth, gimbal friction, etc., and for that reason must be periodically corrected. To overcome these difficulties it has been proposed heretofore to "slave" the directional gyro to the magnetic meridian by the provision of means for comparing the positions of the gyro and the compass and correcting the gyro in response to any detected deviation of the gyro from the magnetic meridian reference. The gyro is usually corrected by the use of a torque motor for applying a precessing torque to the gyro about the horizontal gyro axis in a direction to cause precession of the gyro about the vertical gyro axis in the desired direction. With such a device, some means must be provided to keep the spin axis of the gyro approximately level in order to obtain maximum rigidity about the vertical axis.

Accordingly, it is a specific object of the present invention to provide a new and improved arrangement for maintaining level the spin axis of a directional gyro actuating a direction indicator.

A further object of the invention is to provide an improved arrangement for applying torque to the gyro about the horizontal gimbal axis to cause precession of the rotor to the desired azimuth heading, and for simultaneously applying torque to the gyro about the vertical gimbal axis to cause precession about the horizontal gimbal axis in a direction to maintain the gyro spin axis in a level position.

Another object of the invention is to provide a torque motor for precessing the directional gyro which has structural parts in common with the leveling system whereby a simplified and more compact design is obtained.

Other objects and advantages of our invention

2 will become apparent as the following description proceeds.

For a more detailed description of the present invention, reference should now be made to the following description taken in connection with the accompanying drawings.

Referring to the drawing, the direction indicating instrument is shown as comprising a frame 1 having attached at one end a face plate 2 which is adapted to be mounted on an instrument panel of an aircraft so that a circular opening 3 in the face plate faces the pilot, or other observer. The pilot observes through the opening 3 the movements of a compass dial 4, portions of which are visible through openings 5 and 6 in a masking plate 7. Azimuth indication is obtained by reading a scale 8 on the compass dial 4 against the fixed reference point 9 on the masking plate 7. Reverse heading indications are provided by means of an inner scale 10 (Fig. 2) on the compass dial 4 which is read against a stationary reference 11 on the masking plate 7. The compass dial 4 is rigidly mounted on a hollow hub member 12 which is in turn rigidly secured to one end of a shaft 13 extending lengthwise of the frame 1, the shaft 13 being supported at both ends by means of bearings 14 and 15 which are mounted on the frame.

In order to rotate the shaft 13 and the compass dial 4 in response to turning of the instrument, and thereby indicate direction or azimuth heading, there is provided a directional gyro indicated generally at 16. As shown, the directional gyro comprises a rotor 17 (Fig. 3) which is rotatably mounted in a rotor bearing frame or housing 18, suitable drive motor means (not shown) being provided in the housing 18 for driving the rotor. The gyro frame 18 is rotatably mounted on a gimbal 19 by means of bearing pivots, one of which is shown at 20, so that the frame is free to rotate relative to the gimbal about a horizontal gimbal axis, the gimbal axis being at right angles to the spin axis of the gyro rotor. The gimbal 19 is mounted for rotation relative to the frame 1 about a vertical axis of the gyro by means of bearings 21 and 22. In order to transmit movements of the gyro gimbal 19 to the compass dial 4, there is provided a gear 23 which is connected to the lower portion of the gimbal and which engages a cup gear 24 mounted on the rear end of the shaft 13. In order to prevent back-lash and binding between the gears 23 and 24, the gear 24 is loosely mounted on a hub 25 connected to the end of shaft 13 so that the gear 24 is free to slide axially on the hub a limited amount. The cup gear 24 is urged into engagement with the gear 23 by means of springs 26 which are fastened to the hub 25 and bear against the surface of the gear, the outer ends of the springs 26 being received in slots 27 to prevent relative rotation between the gear and the hub.

Figure 1:
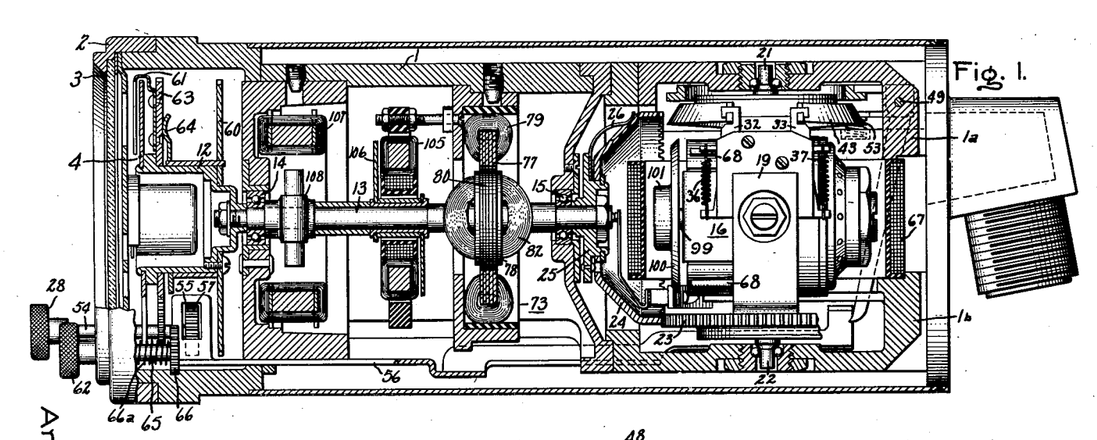
Fig. 1 is a side elevation view in section of a gyroscopic direction indicator embodying the features of the present invention.
Figure 2:
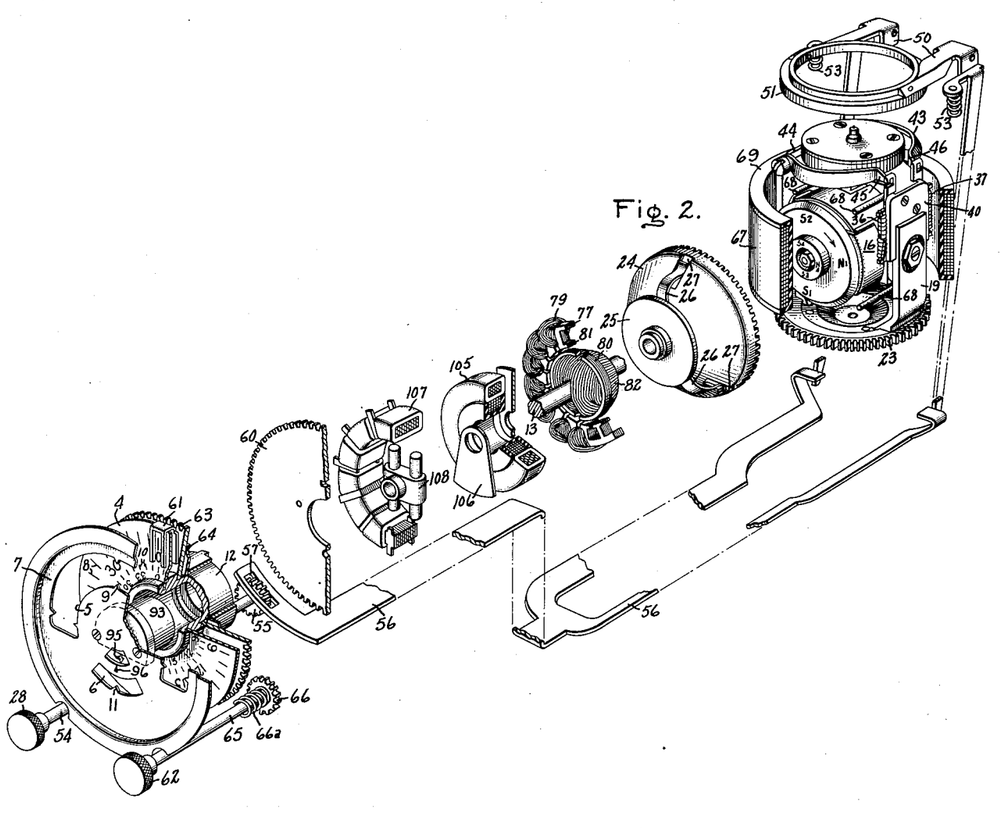
Fig. 2 is an exploded perspective, partly in section.
Figure 3:
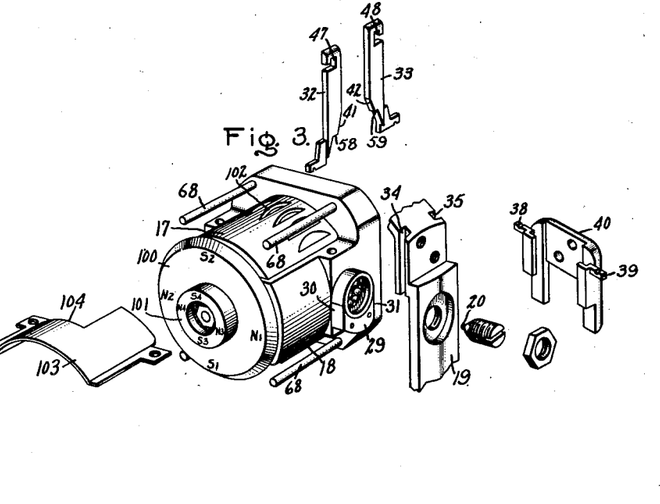
Fig. 3 is an exploded perspective view showing certain details of construction of the gyro rotor, the rotor bearing frame and the supporting gimbal.
Figure 4:
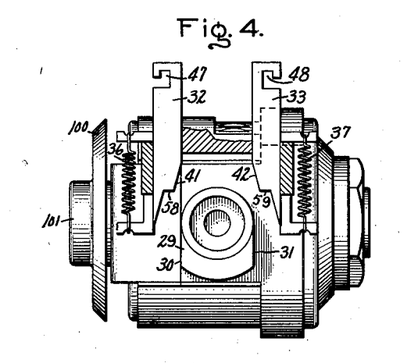
Fig. 4 is a side view of the gyro frame showing the caging fingers in the retracted position.

The instrument is provided with a gyro caging knob 28 which, when manually pushed inwardly from the position shown in Fig. 2, acts to cage the gyro 16 by locking the bearing frame 18 to the gyro gimbal 19. The manner in which this caging is accomplished will now be described. As best shown in Fig. 3 of the drawing, the gyro bearing housing 18 is provided with a cam 29 having substantially parallel side surfaces 30 and 31 which lie in a vertical plane when the spin axis of the gyro is horizontal. The cam surfaces 30 and 31 are adapted to be engaged by a pair of caging fingers 32 and 33 which are slidably mounted in vertical slots 34 and 35 provided in the gimbal 19. The caging fingers 32 and 33 are normally maintained in a retracted position shown in Fig. 4 by means of tension springs 36 and 37 extending between the lower portions of the caging fingers and lugs 38 and 39 projecting from a support 40 which is secured to the gimbal 19. When the caging fingers 32 and 33 are moved downwardly against the bias of the springs 36, 37, beveled portions 41 and 42 of the caging fingers first engage the cam surfaces 30 and 31 rotating the gyro bearing frame to a central position. Continued downward movement of the caging fingers then locks the cam 29 and the gyro bearing housing in the central position, the cam surfaces 30 and 31 being restrained between the upper inner surfaces of the caging fingers.

In order to provide means for moving the caging fingers 32 and 33 to the extended caging position in response to an inward movement of the caging knob 28, there is provided a U-shaped lever 43, the base portion of which is pivoted on the gimbal 19 at 44. The lever 43 has tapered end portions 45 and 46 which are received in notches 47 and 48 in the upper ends of the caging fingers 32 and 33 so that a downward pivotal movement of the lever 43 moves the caging fingers to the lower caging position. Pivotally mounted on the rear portion of the frame 1 at 49 are L-shaped levers 50, the upper horizontally extending ends of which carry a ring 51 adapted to engage the lever 43 when the levers 50 are pivoted counterclockwise, as viewed in Fig. 2. The levers 50 and the ring 51 are biased to the uncaged position by means of compression springs 53, as shown. The caging knob 28 is mounted on an inwardly slidable shaft 54 which carries at its inner end a gear 55. An inward caging movement of the knob 28 and shaft 54 is transmitted to the lower ends of the levers 50 to effect a caging of the gyro by means of an offset lever 56 having a bifurcate rearward end portion engaging the lower portions of the levers 50. The forward portion of the lever 56 is coupled to the shaft 54 by the provision of an end portion having an opening 57 which hooks over the gear 55 as shown. It can now be seen that an inward caging movement of the knob 28, the shaft 54 and the lever 56 causes counterclockwise pivotal movements of the levers 50 and movement of the lever 43, which in turn causes a downward movement of the caging fingers 32 and 33 whereby the gyro is caged.

Figure 5:
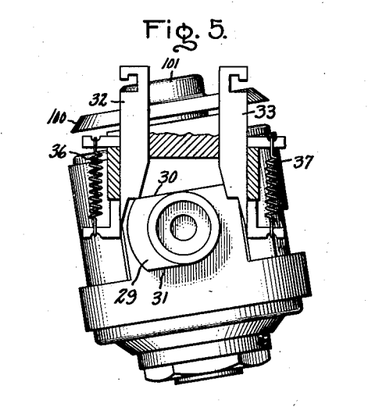
Fig. 5 is similar to Fig. 4 except that the gyro is shown as rotated to the gimbal stop position.

It has been found that a directional gyro can be made universal in operation, i. e., will remain operative while the aircraft on which the instrument is mounted is maneuvered 360 degrees about each of the three principal control axes, by the provision of a gimbal stop means which becomes effective a few degrees short of the gimbal lock position in which the spin axis of the gyro would move into alignment with the vertical axis of the gyro. Such a stop arrangement not only prevents large errors in azimuth indication which arise if the gyro spin axis is permitted to move to the gimbal lock position, but also operates, when engaged, to rotate the gimbal of the gyro 180 degrees as a result of the gyroscopic torques developed. Such a rotation of the gimbal and its connected compass dial prevents reverse indication which otherwise may occur when a universal directional gyro is maneuvered through the gimbal lock position. This gimbal stop feature is disclosed and broadly claimed in a copending application, Serial No. 594,628, filed May 19, 1945 by Anna C. Sinks, administratrix, on behalf of the inventor Allen T. Sinks, which application is assigned to the same assignee as the present invention. In the present instrument this gimbal stop feature is incorporated as a part of the caging mechanism. Thus it will be noted that the caging fingers 32 and 33 are provided with notches 58 and 59 which are adapted to be engaged by the cam surfaces 30 and 31 of the cam 29 upon rotation of the gyro rotor frame a predetermined amount in either direction from the horizontal caged position. As shown in Fig. 5, when the rotor frame is rotated clockwise the cam surface 30 engages the notch 58 limiting further movement of the rotor frame relative to the gimbal 19. Similarly, if the rotor frame is rotated counterclockwise an equal amount in the opposite direction from the horizontal position, the cam surface 31 will engage the notch 59. The amount of further angular rotation of the rotor frame from the stop position to the gimbal lock position in which the rotor spin axis would be aligned with the vertical axis of the gyro gimbal may be termed the stop angle. In order to prevent large errors due to the displacement of the gyro spin axis as a result of the 180 degree rotation of the gimbal upon engagement of the stop, the stop should be designed so that the stop angle is small, being of the order of two or three degrees. When the caging knob 28 is moved outwardly to the uncaged position, the upward movement of the caging fingers 32 and 33 automatically positions the notches 58, 59, whereby the desired gimbal stop angle is obtained as explained above.

It is desirable in the present instrument to provide means for rotating the directional gyro and its associated compass dial 4 after the gyro is caged to permit a manual setting of the directional gyro so that the reading of the compass dial 4 corresponds with the reading of the reference magnetic compass. This is accomplished by the provision of a gear 60 which is rigidly connected to the hub 12, the gear being positioned so that it is engaged by the gear 55 when the knob 28 and the shaft 54 are pushed inwardly to the caged position. After the gears 55 and 60 have been engaged or meshed by this movement a rotation of the knob 28 causes a rotation of the gear 60, which in turn rotates the directional gyro 16 and the compass dial 4.

In order to assist the pilot in maintaining a preset course, a course setter 61 is provided which may be rotated to any position on the scale 8 by means of a control knob 62. The course setter 61 is carried on a gear 63 which is slidably mounted on the hub 12, the gear 63 and the course setter 61 being frictionally restrained in any preset position by means of the spring 64. The course setting knob 62 is carried on a slidable shaft 65 on the inner end of which is mounted a gear 66 adapted to engage the gear 61 when the knob 62 and the shaft 65 are pulled outwardly to the operating position against the force of a biasing spring 66a.

As pointed out before, a directional gyro, while it gives a dead-beat reference and is unaffected by accelerations, is subject to the disadvantage that it tends to wander or drift slowly because of rotation of the earth, friction of the gimbal bearings, etc. This difficulty is overcome by the provision of a compass controlled torque motor which acts continuously to precess the gyro so that the spin axis thereof is maintained in predetermined relationship with the magnetic meridian as measured by the compass. The torque motor for precessing the spin axis of the directional gyro to the desired azimuth heading comprises a precessing coil 67 which coacts with a plurality of permanent magnets 68 mounted on the gyro rotor frame 18. The precessing coil 67 is wound on a flanged ring 69, the ring being clamped between two sections 1a and 1b of the frame 1, so that the ring surrounds the gyro and is coaxial with the vertical axis of the gyro. The ring is also preferably arranged so that a plane through the center thereof which is normal to the axis of the ring passes through the intersection of the three gyro axes for a reason which will subsequently become apparent. The permanent magnets 68 which are mounted on the frame 18 are arranged so that they produce magnetic fields extending at right angles to the axis of the ring 69. Therefore, when a direct current is passed through the precessing coil 67, there is an interaction between the magnetic fields produced by the coil 67 and the permanent magnet 68 such that a precessing torque is applied to the gyro about the horizontal gimbal axis. This causes the gyro to precess about the vertical axis in a direction dependent on the direction of the applied precessing torque which, in turn, depends upon the direction in which current flows through the precessing coil 67.

Figure 6:
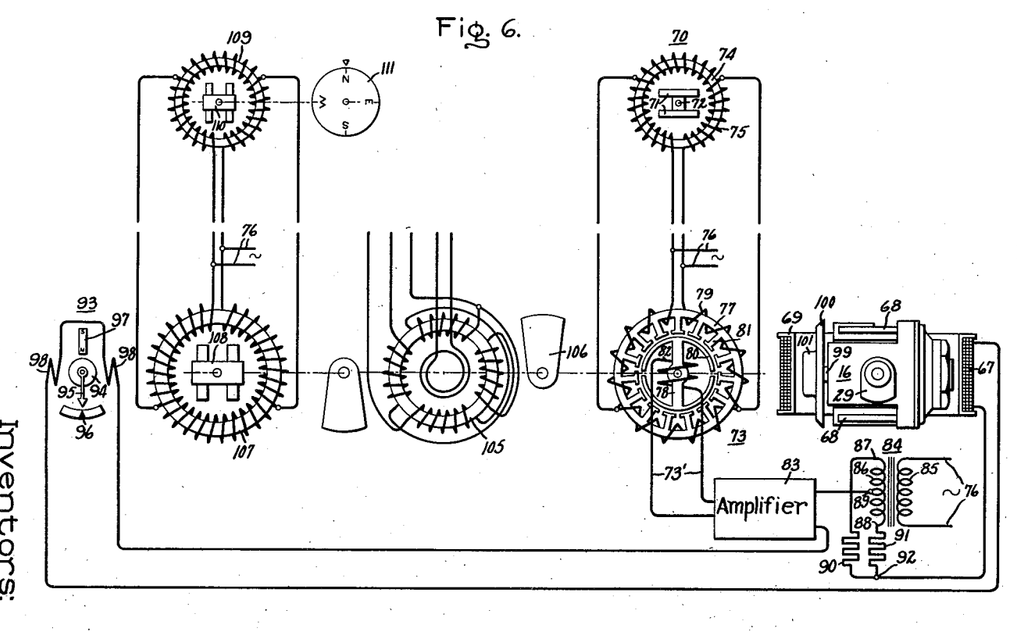
Fig. 6 is a schematic wiring diagram showing the electrical connections between the gyroscopic indicator and the compass control therefor.

The torque motor is controlled by means of a magnetic compass 70 which is shown diagrammatically in Fig. 6 of the drawing. The compass 70 is shown as comprising a pair of compass magnets 71 which are pivotally mounted at 72 in a horizontal position so that the compass magnets are free to swing into alignment with the horizontal component of the earth's field and thereby indicate the direction of the magnetic meridian. The position of the compass magnet 71 relative to the aircraft on which the compass is mounted is transmitted electrically to a detector unit 73 which compares the position of the compass with the position of the spin axis of the gyro and produces an alternating current signal voltage across the conductors 73' upon a departure of the spin axis of the gyro from a predetermined relationship with the compass magnets, the polarity of the alternating current signal being indicative of the direction of the error. A second harmonic type of electrical position-transmitting system is used to transmit the position of the compass 70 to the detecting unit 73. The compass transmitter unit is shown as comprising a stationary annular core 74 formed of permeable magnetic material such as "Permalloy," the core carrying a uniformly distributed exciting winding 75 which is connected to be energized from a suitable source of alternating current supply 76. The core 74 is arranged to be saturated periodically by the alternating current flowing in the exciting windings so that the magnetic flux flowing in the core from the compass magnets 71 is caused to pulsate whereupon second harmonic voltages are induced in the winding 75. The detector unit 73, which is essentially a polyphase selsyn, comprises a stationary annular stator 77 which is mounted on the frame 1 of the instrument and a coaxially arranged rotor 78 which is mounted on and rigidly connected to the shaft 13. The stator core 77 of the detector unit is provided with a toroidal winding 79 which is connected to the alternating current supply lines 76. The winding 75 of the compass transmitter unit and the winding 79 of the detector unit are provided with corresponding taps or polyphase connections which are symmetrically interconnected as shown, whereupon an alternating current flux is produced across the diameter of the core 77, the direction of the axis of this flux varying in accordance with the orientation of the compass magnets 71 relative to the compass transmitter. The rotor 78 of the detector unit is formed of magnetic material and forms a path for the second harmonic flux flowing across the stator core, and in order to assist in collecting the stator flux the rotor 78 is provided with arcuate pole pieces 80 as shown. To further assist in the passage of the second harmonic flux across the detector stator, the stator is provided, as shown, with salient pole pieces 81, which lie closely adjacent the rotor pole pieces 80 to provide a low reluctance magnetic path. The rotor 78 is provided with a single phase rotor winding 82 which is connected as shown to the alternating current signal leads 73'. Since the shaft 13 on which the rotor 78 of the detector 73 is mounted is positioned by the directional gyro, it can be seen that so long as the spin axis of the gyro maintains a predetermined relationship with the magnetic compass the alternating current across the signal leads 73' will remain zero, provided the axis of rotor 78 is initially set perpendicular to the stator flux axis, since any turning of the compass magnets relative to the aircraft in response to a turning of the aircraft will be accompanied by a corresponding rotation of the directional gyro relative to the instrument case. However, upon any departure of the spin axis of the gyro from the said predetermined relationship, an error signal in the form of an alternating current voltage will appear across the leads 73', the polarity of which indicates the direction of the deviation.

Since the alternating current error signal derived from the detector unit 73 is relatively weak, an amplifier 83 is provided for amplifying the error signal voltage, the amplifier 83 being illustrated schematically since it may be of any conventional construction. The output of the amplifier 83 is then rectified, and the rectified signal is then supplied to the precessing coil 67 of the torque motor to cause precession of the directional gyro. In order that the direction of the direct current flow in the precessing coil will be in accordance with the polarity of the alternating current error signal from the detector unit 73, a rectifier must be used of the type which maintains a polarity correspondence between the input alternating current and the output direct current. Heretofore, electronic discriminator rectifiers of the type using two normally balanced output tubes have been used for this purpose. Such balanced electronic devices, however, are subject to the disadvantage that the normally balanced output tubes must be perfectly matched with identical output characteristics or the rectified output currents will not be equal for opposite polarities of the alternating current input error signal. Since the compass magnets normally swing back and forth about a mean position, it is desirable that the precessing torque applied to the gyro have a corresponding mean value for minimum error. However, if the output of the rectifier is unsymmetrical, as is frequently the case with balanced electronic rectifiers, the gyro spin axis will assume a mean position which is not in correspondence with the mean position of the compass magnet whereupon an error in azimuth indication will result. To overcome this difficulty, a special type of rectifier is provided which inherently maintains symmetry of direct current output for alternating current input signals of either polarity. As shown, the rectifying means comprises a transformer 84 having a primary winding 85 and a secondary winding 86, the primary winding being connected to the same source of alternating current supply 76 that supplies the compass transmitter unit. The secondary winding 86 of the transformer 84 is provided with two end connections 87 and 88 and a center tap connection 89. The end connections 87 and 88 are connected to two non-linear resistors 90 and 91 having negative resistance-current characteristics, i. e., as the current flowing through them or the voltage applied across them increases, the resistance decreases, and vice versa. While various types of non-linear resistors or impedances may be used, it is preferred to use non-linear resistors formed of a material known to the trade as "Thyrite." For a more complete description of the characteristics of such material, reference may be had to United States Patent No. 1,822,742, granted September 8, 1931 on application of K. B. McEachron. The two remaining terminals of the non-linear resistors 90 and 91 are connected together at a common point 92, as shown. The rectifying means as described has the property that if a load circuit including an alternating current supply having twice the frequency of the alternating current supplied to the primary of transformer 84 and in correct phase relation thereto, is connected to the center tap 89 and the common connection 92, a rectifying action will take place, the direction of flow of the rectified current being in accordance with the polarity of the alternating current connected to the load circuit. The reason for the rectifying action is the fact that the non-linear resistors 90 and 91 act as "valves" in that their ohmic values are lowered twice per cycle of the fundamental A.-C. voltage derived from the supply line 76 in the region of the peak A.-C. values. This permits second harmonic currents to flow which have one polarity, the currents of the opposite polarity being blocked or greatly retarded twice per cycle of the fundamental when the alternating current of the supply voltage is low or at zero value and the ohmic values of resistors 90 and 91 are high. This rectifying scheme has the advantage that no normally balanced devices are used so that symmetry between the A.-C. input and the rectified D.-C. output is maintained, and also at the same time correspondance is maintained between polarity of the A.-C. input and the D.-C. output.

The use of two non-linear resistors connected as shown has the advantage that the fundamental A. C. cancelled out so that it does not appear in the rectified output and in addition twice the current capacity of each resistor is obtained. However, one non-linear resistor may be used if desired. The gyro system rectification arrangement discussed hereinabove is disclosed and claimed in the copending application of A. T. Sinks et al., Serial No. 112,092, filed August 2, 1949, for: Gyroscopic Direction Indicator, assigned to the same assignee as that of the present invention, which copending application is a division of the present application.

As shown, the precessing coil of the torque motor 67 and the output of the alternating current signal amplifier 83 are connected in series circuit relationship with the rectifier connections 89 and 92. Due to the fact that the compass transmitter system previously described inherently produces a second harmonic signal voltage, the desired rectifying action takes place and the directional gyro is caused to precess about its vertical axis in a direction dependent upon the polarity of the alternating current error signal derived from the detector unit 73. Therefore, so long as the directional gyro and the compass are in correspondence, the error signal is zero and no current flows to the precessing coil of the torque motor. However, if the directional gyro tends to wander in one direction or another from the azimuth heading indicated by the compass, the torque motor acts to precess the directional gyro in a direction to return to the correct azimuth heading.

In order to provide means for indicating correspondence, or lack of correspondence, between the directional gyro and the magnetic compass, there is provided a correspondence indicator 93 which may be conveniently mounted on the masking plate 7, as shown, space being provided for the body of the instrument within the hollow hub member 12. The correspondence indicator 93 is a zero center type of direct current ammeter which may be connected as shown in Fig. 6 in series circuit relation with the precessing coil 67 of the gyro torque motor. The indicator 93 may also be connected in parallel with coil 67 if desired. Any suitable direct current ammeter may be used, such as, for example, the one shown in United States Patent No. 2,102,409, granted December 14, 1937 on application of H. T. Faus. Such an instrument is illustrated schematically in Fig. 6 as comprising a rotatably mounted permanent magnet 94 to which is connected a movable pointer 95, the pointer being normally kept opposite a stationary reference index 96 by means of a stationary centering or pull-off permanent magnet 97. Stationary current coils 98 are arranged to produce a magnetic flux tending to rotate the rotor magnet 94 so that the pointer 95 moves in a direction relative to the index 96 dependent upon the direction of current supplied to the current coils 98. It will now be clear that whenever the gyro and the compass are in correspondence the error signal will be zero, the direct current in the precessing coil 67 and the correspondence indicator 93 will also be zero, and the pointer 95 will be opposite the reference index 96 indicating the correspondence condition. On the other hand, if the gyro moves out of correspondence with the compass, the error signal from the detector unit 73 will not be zero and the resulting direct current flow in the precessing coil 67 and the correspondence indicator will cause the pointer 95 to move off the center mark in one direction or another, depending upon the direction of the correspondence error. Due to the fact that the correspondence indicator 93 is centrally located relative to the compass dial 4, it is convenient for the pilot or other observer to check the correspondence of the gyro with the compass whenever a determination of the azimuth heading is being made by an observation of the compass dial. The gyro system correspondence indicator arrangement discussed herein is disclosed and claimed in the copending application of A. T. Sinks et al., Serial No. 112,092, filed: August 2, 1949, for: Gyroscopic Direction Indicator, assigned to the same assignee as that of the present invention, which copending application is a division of the present application.

As pointed out before, it is desirable to provide some means for keeping the spin axis of the directional gyro level as otherwise it may be thrown off by the operation of the torque motor, friction in the gimbal bearings, etc. The leveling of the directional gyro spin axis is accomplished by a novel eddy current leveling system which will now be described. The gyro rotor 17 is provided with a shaft extension 99 on which is mounted a circular magnet disk 100, which is formed of suitable permanent magnet material. The magnet disk 100 is permanently magnetized so that magnetic fields are produced which flow outwardly from the disk in a direction to pass through the ring 69 which is formed of current-conducting material which is non-magnetic, such as copper or aluminum. Thus, as best shown in Fig. 3 of the drawing, the magnet disk 100 is magnetized so that magnet poles of opposite polarity N1, S1, and N2, S2 are spaced about the periphery of the disk. In order to strengthen the magnetic field produced by the magnet disk an annular projection 101 is provided which is also magnetized so as to provide additional alternate magnetic poles N3, S3, and N4, S4 spaced about the periphery thereof. The magnet disk 100 in rotating with the gyro rotor 17 produces a rotating magnetic field which sweeps the ring 69 and results in the generation of eddy currents therein. As pointed out before, the ring 69 is located so that a plane passing through the center thereof is normal to the vertical axis of the gyro and passes through the intersection of the gimbal axes. Thus, when the spin axis of the directional gyro is normal to the vertical axis and is therefore in a horizontal position, the density of the magnetic flux passing through the ring 69 is symmetrical with reference to the axis of rotation of the gyro rotor and consequently the eddy current drag forces exerted on the rotor are likewise symmetrical with respect to the rotor axis. Therefore, there is no net drag torque tending to rotate the gyro in either direction about the vertical axis. However, if for some reason the rotor spin axis should become inclined to the horizontal equilibrium plane, unsymmetrical eddy current drag forces are exerted on the rotor resulting in a tangential precessing force tending to rotate the rotor about the vertical axis of the gyro in a direction depending upon whether the magnet disk 100 moves above or below the center of the ring 69. This tangential precessing torque resulting from the unsymmetrical generation of eddy currents in the ring 69 is in a direction to cause precession of the directional gyro about the horizontal gimbal axis in a direction to restore the spin axis of the gyro to the horizontal equilibrium plane. Thus, for example, assuming the direction of rotation of the gyro rotor in the magnet disk 100 to be clockwise, as viewed in Fig. 2 of the drawing, if the spin axis of the directional gyro tips so as to move the magnet disk 100 downwardly, the eddy current drag force above the spin axis of the gyro is greater than the opposing force below the spin axis of the gyro. The reason for this is the fact that the flux density is greater above the spin axis by virtue of the fact that the magnet disk above the spin axis is moved closer to the ring 69. It is also due, in part, to the fact that the lower part of the magnet disk moves beyond the confines of the ring 69. Therefore, a torque is exerted on the gyro rotor tending to drag it around the vertical axis in a clockwise direction, and as a result the spin axis of the gyro precesses about the horizontal gimbal axis back into the horizontal position, whereupon the eddy current drag forces again become symmetrical with reference to the axis of rotation of the gyro rotor and the net drag torque is again zero. On the other hand, if the gyro spin axis should tip so that the magnet disk 100 moves above the center of the ring, the unsymmetrical generation of eddy currents in the ring results in a net drag torque tending to rotate the gyro rotor counterclockwise about the vertical axis. This causes the gyro to precess in the opposite direction about the horizontal gimbal axis whereupon it is returned to the level spin axis position. Thus it will be seen that the eddy current leveling system acts automatically and continuously to keep the spin axis of the directional gyro level. It should be noted that due to the fact that the ring 69 extends completely around the gyro, the leveling action takes place regardless of the azimuth heading of the spin axis. Thus the compass controlled torque motor is free to cause precession of the directional gyro spin axis to any azimuth heading called for by the compass, and when that azimuth heading is reached, the eddy current leveling system will keep the spin axis of the gyro horizontal for that particular azimuth heading.

In some cases the spin axis of the gyro may become angularly inclined to the plane of the ring 69 to such an extent that the magnet disk 100 moves beyond the confines of the ring 69, in which case there is no eddy current drag torque to effect a leveling of the spin axis. To provide for this contingency, an additional leveling means is provided for leveling the gyro rotor to a point where the eddy current leveling becomes effective. This is accomplished by milling or otherwise shaping the rotor 17 to provide fan blades 102. The blades in displacing the ambient air cause a reaction torque to be exerted on the rotor, this torque having a component about the vertical gyro axis whereby the gyro is caused to precess in a direction to level the rotor. In order to expose the blades 102 to surrounding air to obtain the desired reaction torque, the rotor shield 103 is provided with an aperture 104, as best shown in Fig. 3 of the drawing.

It is believed that the operation of the direction indicator will now be clear in view of the foregoing description. When it is desired to use the device, the compass control system and the directional gyro motor are electrically energized, and after the gyro rotor has come up to speed so as to acquire its property of rigidity, the compass dial 4 is actuated by relative movement between the gyro and the instrument case whereby a dead-beat azimuth indicator is provided. Before using the instrument, a check is made to see whether or not the gyro is in correspondence with the magnetic compass so that the compass dial 4 will indicate the correct heading. If the gyro is not in correspondence with the compass so that the compass dial 4 is reading incorrectly, this fact will be indicated by the correspondence indicator in that the pointer 95 will be deflected one direction or the other from the zero reference 96. If sufficient time is allowed, the gyro torque motor will eventually precess the directional gyro into correspondence with the compass in response to the error signal from the detector unit 73. This operation may, however, take a considerable period of time, particularly if the gyro is initially greatly out of correspondence with the compass. In the present instrument it is unnecessary to wait for this rather slow initial correcting action to take place as the gyro may be initially set into correspondence with the compass manually. To accomplish this, the caging knob 28 is pushed inwardly to effect a caging of the gyro and to simultaneously engage the gears 55 and 60. The gyro and the compass card 4 are then rotated by rotating the knob 28 until the gyro moves into correspondence with the compass, as indicated by the pointer 95 of the correspondence indicator which will then move opposite the zero reference mark 96. The caging knob 28 is then pulled outwardly and the instrument is ready for use. If at any time during operation the directional gyro tends to drift out of correspondence with the compass, the torque motor precesses the gyro back into correspondence as has been explained above. Also, as explained above, the eddy current leveling system operates to keep the spin axis of the directional gyro level at all times by its continuous leveling action. If for some reason the directional gyro should move out of correspondence with the compass, due to improper operation of the torque motor or for some other reason, the operator will be informed of this fact by movement of the pointer 95 of the correspondence indicator away from the zero reference position. Thus in this case the gyro may be set into correspondence with the compass manually as explained above.

If desired, the direction indicating instrument of the present invention may also be used as the rudder control for an automatic pilot. For this purpose a pick-off unit or signal generator is indicated at 105, the pick-off unit being the conventional inductive type having a Z-shaped flux distributing rotor element 106 mounted to be rotated by the shaft 13, as will be well understood by those skilled in the art.

If it is desired to indicate azimuth position at a location remote from the direction indicator, a conventional electric position-transmitting system may be provided for actuating a remote indicator. For this purpose, a standard position-transmitter unit 107 of the second harmonic type is provided having a permanent magnet rotor 108 which is also mounted on the shaft 13 to be rotated thereby. As shown in Fig. 6, the transmitter unit 107 is electrically connected to a similar receiver unit 109 having a permanent magnet rotor 110 which is mechanically coupled to operate a remote indicator 111.

Thus it will be seen that there is provided a direction indicator which is easy to operate, reliable and compact to the point where it can be mounted on the instrument panel of an aircraft where space is at a premium. One of the principal features making the compact design possible is the arrangement wherein the ring 69 performs the dual functions of acting as a support for the precessing coil 67 of the torque motor and also acting as the generator of eddy currents used to level the gyro rotor spin axis.

While we have shown and described particular embodiments of our invention, it will occur to those skilled in the art that various changes and modifications may be made without departing from our invention, and we therefore aim in the appended claims to cover all such changes and modifications as fall within the true spirit and scope of our invention.

What we claim as new and desire to secure by Letters Patent of the United States is:

1. A gyroscopic instrument comprising a gyroscope having a rotor mounted so that the spin axis is free to rotate about first and second mutually perpendicular axes, and means for applying a torque to said gyroscope about said second axis to cause it to precess about said first axis to a position in which the spin axis of said rotor lies in a plane normal to said second axis, said means comprising magnet means mounted to rotate with said rotor and a relatively fixed eddy current ring in inductive relation with said magnet means, said ring being coaxial with said second axis.

2. A gyroscopic instrument comprising a gyroscope having a rotor universally mounted so that the spin axis of the rotor is free to rotate about mutually perpendicular first and second axes, means for precessing said rotor about said first axis by applying a torque tending to rotate said rotor about said second axis, said precessing means comprising magnet means mounted to rotate with said rotor adjacent one end thereof, and a relatively fixed eddy current ring surrounding said rotor and coaxially arranged with said second axis, said ring being located so that torque is applied about said second axis in a direction dependent upon the direction of displacement of said spin axis from an equilibrium plane normal to said second axis.

3. In a gyroscopic instrument, a gyroscope comprising a rotor mounted so that the spin axis is free to rotate about first and second mutually perpendicular axes, and means for precessing the gyroscope so that the spin axis tends to seek a predetermined angular position relative to said second axis, said precessing means comprising magnet means mounted to rotate with said rotor and a relatively fixed current conducting ring in inductive relation with said magnet means, the axis of said ring being coaxial with said second axis.

4. In combination, a gyroscope having a relatively fixed support, a rotor rotatably mounted in a bearing frame, a gimbal, means for mounting said rotor bearing frame on said gimbal so that it is free to rotate relative to said gimbal about a first axis perpendicular to the spin axis of said rotor, means for mounting said gimbal on said support so that it is free to rotate relative to said support about a second axis, means for precessing said gyroscope so that the rotor spin axis seeks an equilibrium plane perpendicular to said second axis, said precessing means comprising magnet means connected to rotate with said rotor and a coacting current-conducting ring mounted on said support so as to surround said gyroscope, said ring being positioned in said equilibrium plane and retractable means mounted on said gimbal and movable into engagement with a positioning member on said bearing frame for initially positioning said bearing frame about said first axis to bring said magnet means into operative relation with said current conducting ring.

5. In combination with a directional gyro comprising a rotor mounted for three degrees of freedom about horizontal and vertical axes and the rotor spin axis, precessing means for applying torque about said vertical axis to maintain the spin axis level, said precessing means comprising magnet means mounted to rotate with said rotor and a coacting relatively fixed current conducting ring surrounding said rotor, said ring being located in a horizontal plane.

6. A directional gyroscope comprising a rotor mounted so that the spin axis is free to rotate about horizontal and vertical axes, and means for applying a torque to said gyroscope about said vertical axis to cause it to precess about said horizontal axis to a position in which the spin axis of said rotor is horizontal, said means comprising permanent magnet means mounted to rotate with said rotor and a relatively fixed horizontal eddy current ring in inductive relation with said magnet.

7. A directional gyroscope comprising a rotor mounted so that the spin axis thereof is free to rotate about horizontal and vertical axes, and means for precessing said gyroscope so that the spin axis of said rotor moves into a horizontal plane in response to a departure of said spin axis from said horizontal plane, said precessing means comprising magnet means connected to rotate with said rotor to produce a magnetic field rotating with said rotor and a relatively fixed horizontal ring of current-conducting material in inductive relationship with said magnetic field, said ring being located so that eddy current drag torques are exerted on said gyroscope causing it to precess into a horizontal plane regardless of the azimuth direction of the rotor spin axis.

8. A directional gyroscope comprising a rotor universally mounted so that the spin axis thereof is free to rotate about mutually perpendicular horizontal and vertical axes, and means for precessing said gyroscope so that the spin axis of said rotor tends to remain in a horizontal plane, said precessing means comprising magnet means mounted to rotate with said rotor and a relatively fixed current conducting member in inductive relation with the field produced by said magnet means, said current conducting member being in the form of a ring surrounding said rotor whereby a precessing torque is applied to said gyro tending to level the rotor spin axis regardless of the azimuth direction of the spin axis.

9. In combination with a directional gyro comprising a rotor mounted for three degrees of freedom about horizontal and vertical axes and the rotor spin axis, first precessing means for applying a torque about said horizontal axis to change the azimuth heading of the spin axis, and second precessing means for applying torque about said vertical axis to maintain the spin axis level, said second precessing means comprising magnet means mounted to rotate with said rotor and a coacting, relatively fixed current conducting ring surrounding said rotor, said ring being coaxial with said vertical axis.

10. In combination a directional gyroscope comprising a rotor rotatably mounted in a bearing frame, gimbal means for supporting said frame so that it is free to pivot about horizontal and vertical axes whereby said gyroscope has three degrees of freedom, a first precessing means for applying torque to said gyroscope about said horizontal axis to change the azimuth heading of the rotor spin axis, said first precessing means comprising first magnet means mounted on said bearing frame so as to produce a horizontal magnetic field and a coil surrounding said gyroscope for producing a vertical magnetic flux reacting with the field produced by said first magnet means, and second precessing means for applying a torque to said gyroscope about said vertical axis to maintain the spin axis of said rotor level, said second precessing means comprising second magnet means mounted to rotate with said rotor and a coacting relatively fixed current-conducting ring surrounding said rotor, said ring acting additionally as a support for said coil.

11. In combination a directional gyro comprising a rotor rotatably mounted in a bearing frame and a gimbal support therefor, said gimbal being mounted to rotate about a vertical axis and said frame being mounted to rotate relative to said gimbal about a horizontal axis perpendicular to the spin axis of said rotor, a two-position caging control device having a caging position and an operating position, means for locking said frame to said gimbal when said control device is in the caging position and for freeing said frame for limited rotation relative to said gimbal when said control device is in the operating position, said means comprising a cam mounted on said frame, a pair of caging fingers slidably mounted on said gimbal, said fingers being shaped to engage opposite sides of said cam and lock said cam when in an extended position and to engage said cam in a retracted position only after said frame has rotated relative to said gimbal to a position just short of the gimbal lock position in which the spin axis of said rotor would be aligned with the vertical axis of said gimbal, spring means holding said caging fingers in said retracted position and means responsive to movement of said control device from said operating position to said caging position for moving said fingers to said extended position.

12. In combination, a gyroscope having a rotor bearing frame pivotally mounted on a supporting gimbal, a cam mounted on said frame, a pair of caging fingers mounted on said gimbal so as to be movable to extended and retracted positions, said cam and fingers being shaped so that said fingers when moved to the extended position engage opposite sides of said cam and thereby rotate said frame to a central locked position, said fingers when retracted moving away from said cam to permit free rotation of said cam and said bearing frame to predetermined angular positions on either side of said locked position, the movement of said cam and bearing frame beyond said predetermined positions being prevented by engagement of said cam with said fingers and means for moving said fingers between said extended and retracted positions.

ANNA C. SINKS,
*Administratrix of the Estate of Allen T. Sinks, Deceased.*

RICHARD A. PFUNTNER.
SAMUEL GABRIELSON.

REFERENCES CITED

The following references are of record in the file of this patent:

UNITED STATES PATENTS

| Number | Name | Date |
|---|---|---|
| 1,822,742 | McEachron | Sept. 8, 1931 |
| 1,974,220 | Sperry | Sept. 18, 1934 |
| 2,102,409 | Faus | Dec. 14, 1937 |
| 2,126,935 | Von Manteuffel et al. | Aug. 16, 1938 |
| 2,225,014 | Lauck et al. | Dec. 17, 1940 |
| 2,229,645 | Esval et al. | Jan. 28, 1941 |
| 2,298,626 | Nisbet et al. | Oct. 13, 1942 |
| 2,315,216 | Moller et al. | Mar. 30, 1943 |
| 2,328,744 | Roters | Sept. 7, 1943 |
| 2,350,769 | Kimball | June 6, 1944 |
| 2,357,319 | Esval et al. | Sept. 5, 1944 |
| 2,363,495 | Bates | Nov. 28, 1944 |
| 2,390,532 | Haskins et al. | Dec. 11, 1945 |
| 2,424,562 | Fragola | July 29, 1947 |